Oct. 26, 1954 E. A. SCHAAL ET AL 2,692,476
GAS TURBINE ENGINE AIR STARTING MOTOR
CONSTITUTING AIR SUPPLY MECHANISM
Filed Nov. 13, 1950 4 Sheets-Sheet 2

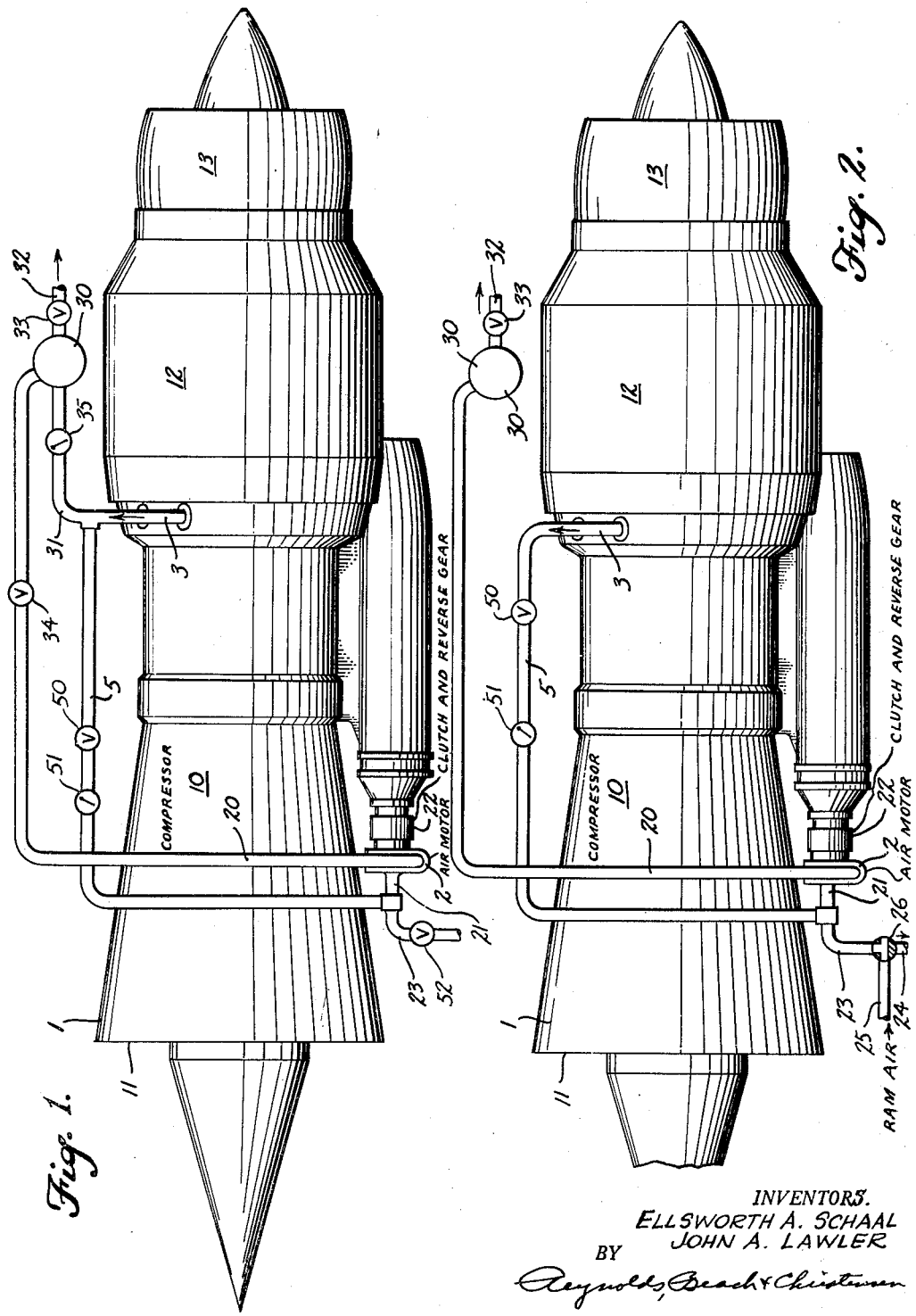

INVENTORS.
ELLSWORTH A. SCHAAL
JOHN A. LAWLER
BY
Reynolds, Beach & Christensen
ATTORNEYS Oct. 26, 1954    E. A. SCHAAL ET AL    2,692,476
GAS TURBINE ENGINE AIR STARTING MOTOR
CONSTITUTING AIR SUPPLY MECHANISM
Filed Nov. 13, 1950    4 Sheets-Sheet 4

INVENTORS.
ELLSWORTH A. SCHAAL
JOHN A. LAWLER
BY

ATTORNEYS

Patented Oct. 26, 1954

2,692,476

UNITED STATES PATENT OFFICE 2,692,476

GAS TURBINE ENGINE AIR STARTING MOTOR CONSTITUTING AIR SUPPLY MECHANISM

Ellsworth A. Schaal and John A. Lawler, Seattle, Wash., assignors to Boeing Airplane Company, Seattle, Wash., a corporation of Delaware Application November 13, 1950, Serial No. 195,284

4 Claims. (Cl. 60—39.14)

This invention relates to gas turbine engines and more particularly to utilization of a gas turbine engine as a source of air under pressure for use in driving auxiliary devices by air motors. The application for which this invention is probably most important is the gas turbine used to drive an airplane of either the jet-propelled type or of the turbo-jet type.

As is well known in the art, a gas turbine engine incorporates three principal components, namely an air compressor, a combustion chamber and a turbine. From the air compressor air under pressure is supplied to the combustion chamber where it is mixed with fuel and ignited. The hot gases propelled from the combustion chamber rotate a turbine wheel, which is connected to the air compressor for driving it. Whether the air compressor is of the axial flow type or of the centrifugal type is unimportant as far as this invention is concerned, although usually an axial flow compressor is used in such engines. Likewise, it is immaterial whether the turbine be of the axial flow or radial flow type, although again the axial flow type of turbine is customary.

It has been proposed heretofore to bleed off compressed air from the engine at a location on the air outflow side of an air compressing portion, such as between the compressor and the combustion chamber, or at some intermediate point in the compressor section itself, for the purpose of obtaining a supply of air under pressure to drive such auxiliary devices in an airplane as wing flaps, turbo generators for generating alternating current electricity, retractible landing gear, and air-actuated wheel brakes. The difficult has been that flaps must be lowered and landing gear projected, for example, when the airplane is gliding down to a landing field and the engines are turning very slowly. At idling speeds the air compressed by the compressors of the gas turbine engine or engines may be insufficient to actuate such auxiliary devices, in which event it may be necessary to increase the speed of one or more engines to supply such auxiliary devices with the necessary air just when increased propulsive power for the airplane is very undesirable.

Since various auxiliary devices, including the more important ones, have required operation during periods of low engine speed, the use of air supplied by the compressor of a gas turbine engine has not proven to be as suitable for use as a source of compressed air for driving these auxiliary devices as would be desirable. The object of this invention is to provide mechanism which will enable a generally conventional gas turbine power plant to be used as a reliable source of compressed air at all engine speeds. Particularly, it is an object to enable such a power plant to provide sufficient compressed air for auxiliary mechanism drive purposes even at idling engine speeds.

It is a further object of the invention to enable automatic control mechanism to be utilized for the purpose of controlling the mechanism of this invention in a manner to maintain an adequate supply of air under pressure at various engine speeds within a wide range, and, if desired, even to provide a greater air supply when the engine is idling than during normal operation of the engine at cruising speed.

If an airplane incorporating the present invention has more than one engine, it is even possible to utilize the first engine started to provide a supply of air sufficient to start another engine or engines while the airplane is on the ground, without the necessity of operating at high speed the first engine started.

The invention for accomplishing the objects mentioned above is best applicable to a gas turbine engine installation in which a small, air-driven radially inward flow turbine or air motor is used to start the main gas turbine engine. More particularly, the starter turbine must be of the type which can be driven mechanically to compress air, as well as being capable of operating as an air motor. Moreover, the connection between the starter turbine and the engine must be such that the turbine drive can turn the compressor of the engine proper for starting the engine, and which will enable the engine, when in operation, to turn the rotor of the air motor mechanically in the direction opposite that in which it runs in starting the engine, so that it will serve as a compressor. The interconnection between the air motor and the engine compressor could thus afford a positive drive in both directions, or a clutch arrangement could be interposed between the air motor and the engine compressor shaft so that, after the engine has been started, the air motor can be disconnected from the engine when a supply of additional auxiliary air is not necessary, and the air motor can again be connected to the engine to be driven by it when it is desired to use the air motor as an auxiliary compressor.

Alternatively the starting air motor could have a reversible vane-type air guide structure which would enable the motor to serve as a motor or compressor when turned in the same direction, simply by reversing the air guide structure vanes.

In a gas turbine engine to which is connected an air motor for starting purposes and capable of compressing air when driven by the engine as described, the present invention contemplates the use of the air motor driven by the engine as a source of compressed air for operating auxiliary devices such as discussed above. In such utilization, after the engine has been started and is operated at idling speeds, the air motor may be driven positively by the engine in the direction opposite that in which it turns for starting the engine, and the normal compressed air inflow duct for the air motor will serve as a delivery duct for air under pressure compressed by the air motor then acting as a compressor.

Air may be supplied such compressor directly from the atmosphere if a large amount of air is not required. If the engine is operating at idling speed or at a speed not appreciably above such speed, air may be supplied to the positively driven air motor by a duct communicating with the compressor section of the gas turbine engine, or the discharge end of such compressor section. At low speeds of the gas turbine engine, therefore, air under pressure derived from the engine compressor will be further compressed by the air motor compressor and delivered to a conduit feeding auxiliary air driven devices. At higher engine speeds sufficient air for driving such auxiliary devices may be supplied either directly from the engine compressor, or by the air motor operating as a compressor compressing air taken entirely or principally from the atmosphere instead of from the compressor of the gas turbine engine.

Various types of ducting arrangements may be utilized in carrying out the purposes of this invention, and automatic control mechanism may be utilized to operate valves in the various ducts appropriately for different types and conditions of operation. Also, different arrangements for interconnecting the air motor and the gas turbine engine, and for controlling such interconnection, may be utilized.

Representative types of mechanism capable of accomplishing the objects of the invention are shown in the accompanying drawings, which is illustrated diagrammatically, and it will be evident that various changes may be made in details of the arrangements shown while still following the principles of the invention.

Figure 1 is a diagrammatic side elevation view of a gas turbine engine installation incorporating one form of mechanism in accordance with the invention, and Figure 2 is a similar view showing an alternative arrangement of mechanism in accordance with the invention.

Figure 3:
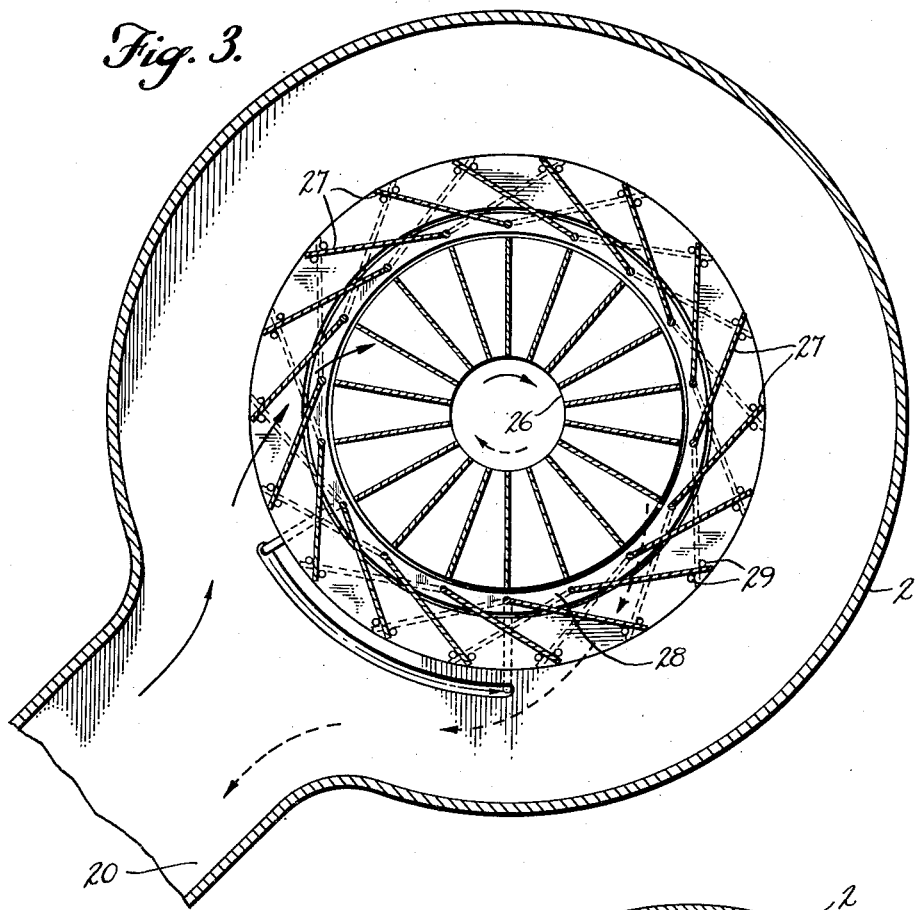
Figure 3 is a central sectional view through a reversible air vane type of air motor taken in a plane perpendicular to the direction of rotation of its rotor.

As has been discussed above, gas turbine engines have become rather widely used, particularly for aircraft propulsion purposes. As a typical application of the present invention, therefore, it has been illustrated in the drawings as incorporated in an airplane gas turbine engine installation. Such a gas turbine engine may be used to drive a turbine for turning a propeller, the gas discharged from such turbine affording jet propulsion, or the propeller driving turbine and propeller may be omitted and the gas discharged from the engine utilized entirely for jet propulsion. The present invention is applicable to either type of engine installation because in each case the engine 1 will include a compressor section 10, into which air is supplied from the inlet 11, a combustion chamber section 12 and a turbine section 13. The turbine in this last-mentioned section is carried by the same shaft as the rotor for the compressor in conventional practice, so that, as the turbine is rotated by gas discharged from the combustion chambers, it will turn the rotor of the compressor in section 10. The mechanism within these sections 10, 12 and 13 has not been shown in the drawings because it is well known.

In starting such a gas turbine engine it is necessary to turn the rotor of the air compressor in section 10 to compress air in it sufficiently to enable combustion to be initiated in the combustion chamber section 12. For thus starting the engine it is conventional to use an air motor 2 which, for the purposes of this invention, preferably is of the rotary type, having a peripheral conduit 20 connected to the exterior of the rotor casing and a conduit 21 connected to the center of one side of the rotor casing. The rotor shaft is connected through a suitable drive mechanism 22 to the compressor of the gas turbine engine in section 10.

Figures 4, 5:
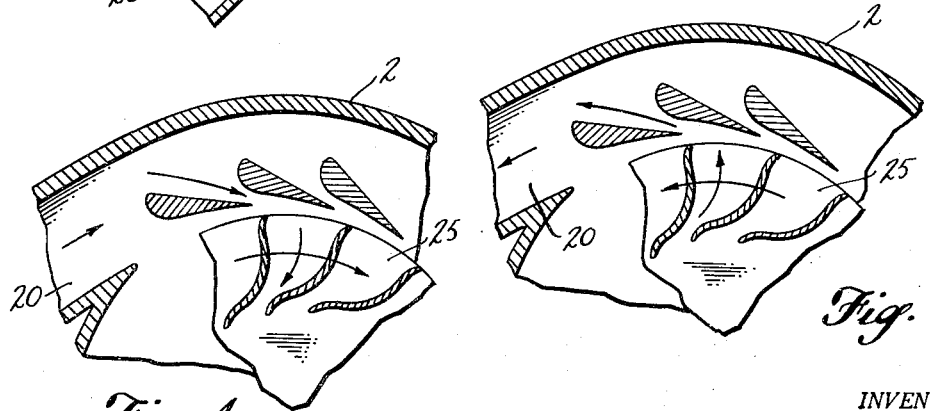
Figure 4 is a fragmentary sectional view through an air motor taken in a plane perpendicular to its rotative axis, showing the rotor turning in the direction in which it revolves when operating as an air motor.
Figure 5 is a similar view illustrating the operation when the rotor is turned in the opposite direction, in which it would rotate when serving as a compressor.

In one form of this invention the drive mechanism 22 will be reversible, the motor utilizing a blade form and arrangement such as shown in Figures 4 and 5. In normal operation air supplied to the air motor 2 through the peripheral tangential conduit 20 will turn the rotor, as illustrated in Figure 4, and in turn rotate the driving mechanism 22 to turn the compressor in the section 10, such air being discharged through the conduit 21. The air motor must be such that, alternatively, when the central conduit 21 is connected to a source of air, preferably though not necessarily compressed, and the air motor rotor is turned positively by the drive mechanism 22 in the direction opposite that in which it was turned to start the engine, as indicated in Figure 5, the air motor will compress the air thus supplied to it to a greater pressure and deliver it through conduit 20. Such action will be obtained if the air motor rotor and its casing are designed to be capable of acting as a centrifugal compressor.

To supply air under pressure from the gas turbine engine itself for driving auxiliary devices a duct 3 is shown for bleeding compressed air from the discharge or high pressure end of the compressor. In conventional installations this conduit would simply be connected to a header 30, from which air is supplied to the various air driven accessory devices. In the installation shown in Figure 1 the conduit 31 interconnects the conduit 3 and the header 30, and no additional duct work would be required for the conventional installation.

For the present invention, however, in addition to the line 31 it is necessary to provide a supply of air to the air motor for the purpose of starting the gas turbine engine. If the airplane has more than one engine, two or more of them could be used as sources of compressed air, in which case all those thus used would be connected in parallel to the header 30. In addition, it will be necessary to supply to the air motor 2 of at least one engine, which conveniently may be by way of the header, outside air for starting the first engine. For that purpose an external source of air under pressure can be connected to a pipe 32, controlled by a valve 33. It is further necessary to connect the conduit 20, leading to the periphery of the rotor casing of motor 2, to the header 30 in order to convey air to the motor, unless the exterior air supply is connected directly to such motor. The opening through this conduit 20 is controlled by a valve 34. This piping likewise is conventional in some gas turbine engines. Air supplied to the motor through conduit 20 is discharged to the atmosphere through conduit 21.

Figure 6:
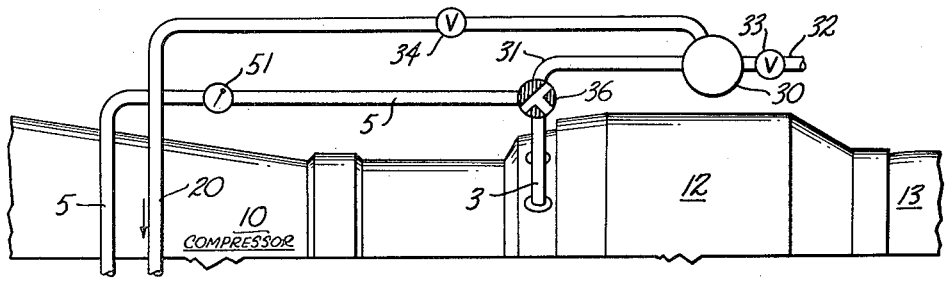
Figures 6, 7 and 8, are fragmentary side elevation views corresponding generally to Figure 1 but illustrating a somewhat different valve arrangement, a valve in the three figures being shown in different operating positions.
Figure 7:
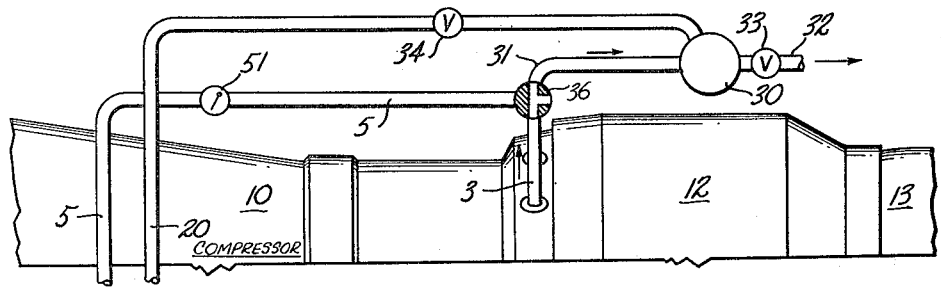
Figure 8:
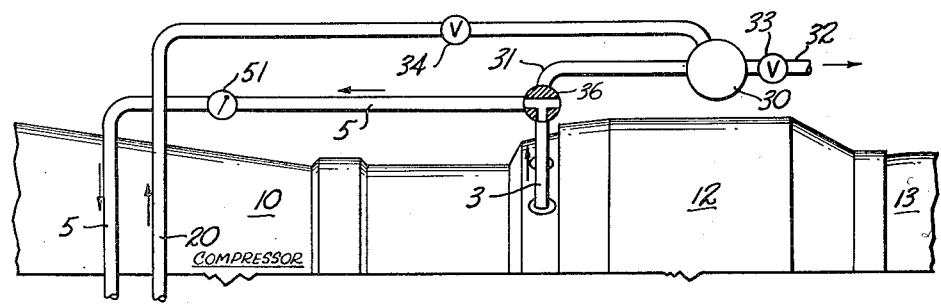

In addition to the piping described, a conduit 5 is connected between the conduit 31, from the engine compressor bleed to the header 30, and the pipe 21 communicating with the center of the air motor casing. A control valve 50 is provided in conduit 5 and a check valve 35 in conduit 31. When valve 50 is closed the compressed air source 3 from the compressor will be connected to the header 30 in conventional fashion. When valve 50 is open, however, air from the compressor bleed conduit will flow into the lower pressure conduit 5, rather than through the pipe 31 connected to the header 30. Air tending to flow into the pipe 5 from the higher pressure region in header 30 will be blocked by check valve 35. Also a check valve 51 is located in pipe 5 in series with valve 50, to prevent air flowing from the high pressure header through conduit 20 and air motor 2, and thence through the conduits 5 and 3 to the engine compressor when such engine is not running or is idling. If desired, a three-way valve could be incorporated at the junction of conduits 5 and 31 instead of providing two separate valves 50 and 35, to serve a similar purpose. This arrangement is illustrated in Figures 6, 7 and 8 of the drawings, in which such a three-way valve 36 is shown in Figure 6 in the closed position which it would occupy during starting of the engine. In its position of Figure 7 air is delivered from the compressor bleed pipe 3 to the air supply pipe 31, whereas with the valve positioned as shown in Figure 8 the air supply from the bleed 3 is fed to the conduit 5 leading to the air motor 2, which serves in that instance as a booster compressor.

Figure 9:
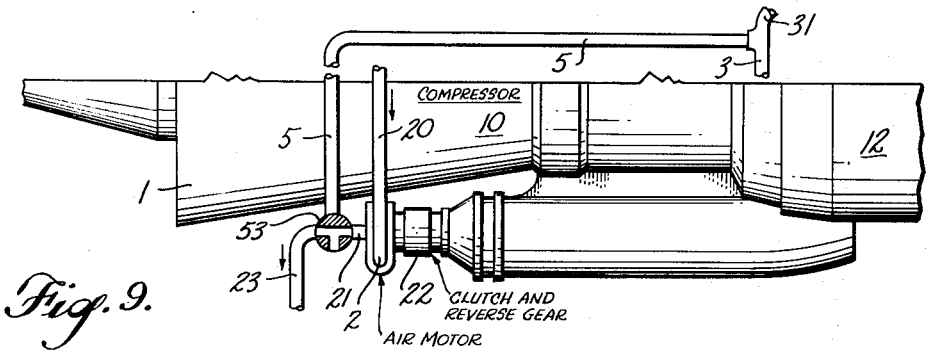
Figures 9 and 10 are fragmentary side elevation views corresponding generally to Figure 1 but showing another alternative valve arrangement.
Figure 10:
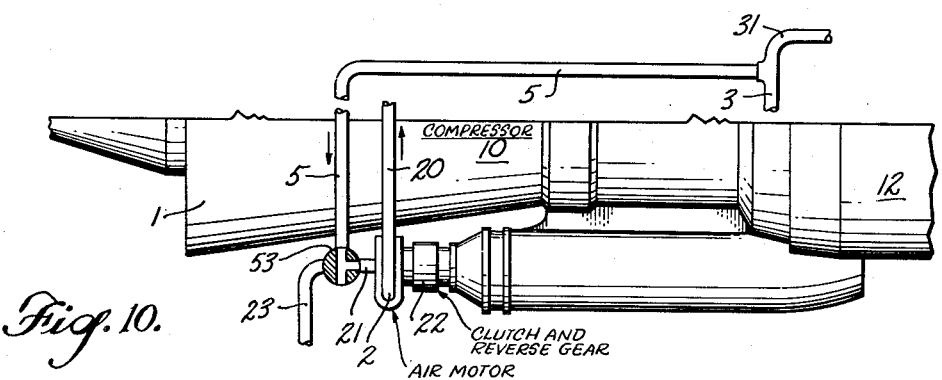

A control valve 52 is located in conduit 23 on the outflow side of the connection of conduit 5 with conduit 21. The air motor rotor casing either can be vented to the atmosphere by opening valve 52 and closing valve 50, or air from conduit 5 can be supplied to the air motor by closing valve 52 and opening valve 50. Again a three-way valve may be located at the junction of conduit 5 and conduit 21 as an alternative construction, if desired, as illustrated by valve 53 shown in Figures 9 and 10. In Figure 9 the valve is shown in the position for starting the engine in which the air supplied to the air motor 2 through conduit 20 is exhausted through conduit 21, valve 53 and conduit 23. When the air motor 2 is serving as a booster compressor the valve 53 is turned to the position of Figure 10 so that air from pipe 3 bleeding from the engine compressor will flow through pipe 5, valve 53 and pipe 21 to the air motor and will be discharged in more highly compressed condition through pipe 20. Where such a three-way valve is used, the valves 50 and 51 shown in Figures 1 and 2 may be omitted.

With the piping arrangement described, in order to start the gas turbine engine the valve 50 would be closed to cut off conduit 5 from the compressed air bleed 3 connected to the gas turbine compressor. Valve 52 would be turned to connect pipes 21 and 23 to the atmosphere. Valve 34 would be opened so that conduit 20 could transmit air from the header 30 to the peripheral portion of the air motor rotor casing, and valve 33 would also be opened if it were necessary to provide air under pressure in header 30 from an auxiliary compressed air supply source 32. Air flowing from the header 30 through conduit 20 would then rotate the air motor rotor 25, as shown in Figure 4, for turning the compressor of the engine, and thereafter the air would be discharged to the atmosphere through pipes 21 and 23 and valve 52.

After the engine has been started two possible types of operation are available with the system of this invention. If it were desired to obtain air under pressure from the gas turbine engine in the conventional fashion from the bleed 3, valve 50 would be left closed yet communication between the bleed and conduit 31 would still be possible. Thus conduit 5 would be cut off from conduit 31, and the air from the bleed 3 would pass directly into the header 30 in the conventional fashion. The driving connection 22 between the air motor rotor and the engine should be disconnected, as by releasing a suitable clutch incorporated in such connection. It will be understood, of course, that the drive mechanism 22 provided for driving the rotor of air motor 2 when operating as a compressor could incorporate gearing of any desired ratio, so that if the gearing turned the air motor rotor at a high speed a very substantial increase in pressure could be achieved.

In the second type of operation valve 50 and valve 34 would be opened, and the clutch of drive mechanism 22 would be engaged so that the air motor rotor would be connected to be driven by the engine. In this type of operation it is essential that such drive of the air motor be in a direction to operate such motor as a compressor. Thus if the motor had a rotor and stator vane construction like that shown in Figures 4 and 5, the drive mechanism 22 would incorporate suitable reversing mechanism to turn the rotor 25 in the direction opposite that in which the rotor was turned when the device acted as a starting motor for the engine. In other words, the direction of rotation of rotor 25 in order for the air motor to act as a compressor would be as illustrated in Figure 5.

Alternatively, a construction shown somewhat diagrammatically in Figure 3 could be employed, in which it would be unnecessary to provide reversing mechanism in the drive transmission 22. In this instance the rotor 26 has rotor vane pockets which are symmetrical about bisecting radial planes, and a movable stator vane construction is employed, enabling the inclination of the latter vanes to be reversed. Thus when the device operates as a motor the vanes 27 would assume the positions shown in solid lines in Figure 3. The inner ends of these vanes are pivoted to the rotatably shiftable control ring 28, while the other ends of these vanes are inserted between guide rods 29. If this ring 28 is shifted sufficiently in a counterclockwise direction, as seen in Figure 3, the vanes will all be swung simultaneously into the broken line positions, so that thereafter when the rotor is turned in the same direction the air motor will serve as a compressor.

Whichever type of air motor structure is employed, air from the compressor bleed 3 in the second type of operation described above will flow through the lower pressure line 5, while conduit 31 will be effectively closed by the higher pressure in header 30 acting on check valve 35. Thus, the pressure of air supplied from the compressor bleed 3 to the turbine 2 would be increased and delivered to the header 30 through the conduit 20 at a pressure higher than the air emitted from the bleed. With such an arrangement, even though the main engine is idling, air bled from its compressor section and compressed by the rotor of air motor 2 will supply a considerable volume of compressed air at a reasonably high pressure, whereas the pressure of the air supplied directly from bleed 3 might be too low to drive the accessory devices.

In Figure 2 an arrangement is shown in which the air motor 2 rather than the bleed 3 will afford the primary source of air under pressure to drive the accessory devices. Consequently the pipe 31 directly connecting the bleed 3 and the header 30, shown in Figure 1, is omitted. Pipe 5, connecting such bleed to the blower, is controlled by valve 50, and check valve 51 is still required to prevent flow of air from header 30 through pipe 20 and pipe 5 to bleed 3 when the particular engine is stopped or idling. Valve 34 in conduit 20 can be omitted. In this arrangement, however, it is desirable to provide alternative connections to the atmosphere, and for this reason the pipe 23 has a static or down-wind connection 24 and an upwind or ram connection 25. Communication between conduit 23 and either conduit 24 or conduit 25 is controlled by a three-way valve 26 inserted at the junction of these pipes.

With valve 26 turned to establish communication between conduit 23 and conduit 24, compressed air may be supplied from the header 30, either from another engine or from the separate supply source 32 past valve 33. This air will turn the rotor of the air motor 2 to start the engine, and will be discharged through pipes 21, 23 and 24. After the engine is started, if no supply of auxiliary air to the header 30 from this engine is required, valve 26 can merely be turned to close pipe 23, and valve 50 disposed to close conduit 5. The clutch in drive mechanism 22 will be disengaged so that the rotor of air motor 2 is not turned by the engine.

As a second possible operation, if only a reasonably small amount of compressed air is required, it can be supplied entirely by the air motors 2 of one or more engines, particularly if the gas turbine engines are being driven at fairly high speed. For this operation either the gearing of the drive mechanism 22 will be connected to drive the rotor of the air motor in the direction opposite that in which it turns for starting the engine, as shown in Figure 5, or the stator vanes will be reversed to the compressing position as shown in broken lines in Figures 3. In order to get the benefit of as much pressure as possible in the supply of air to the air motor without bleeding it from the compressor, valve 26 should now be turned so that pipe 23 will be in communication with the ram air intake pipe 25. Valve 50, of course, will remain closed. With the parts thus arranged, air supplied from the atmosphere will be driven by the impact pressure of flight into pipe 25 and through pipe 23 and pipe 21 to the central portion of the rotor casing of air motor 2. The air thus supplied at a pressure at least somewhat above ambient atmospheric pressure will be compressed by the air motor 2 operating as a compressor and delivered to the header 30.

If the speed of the gas turbine engine is not great enough for the air motor 2 to compress air drawn from the atmosphere to a sufficiently high pressure to operate the accessory devices, a further possible operation of the invention will utilize the bleed 3 instead of the ram duct 25, as the source of air for air motor 2. For this operation valve 50 will be opened, establishing communication between conduit 5 and conduit 21, and valve 26 will be turned to close conduit 23. This operation of the modification shown in Figure 2 is the same as the second operation described of the form of invention shown in Figure 1.

It will be appreciated that the present invention will make always available a sufficient quantity of compressed air for driving accessory devices, and the pressure of such air at a value high enough for this purpose may be obtained at virtually any engine speed. It will be evident further that the various valves may be solenoid operated, and such solenoids may be controlled by mechanism sensitive to the speed of the gas turbine engine and to the pressure of the air in header 30. A typical automatic control arrangement is shown diagrammatically in Figure 11 as including a speed sensitive governor 6 suitably connected to the engine and operable to shift shaft 60 lengthwise so that a switch blade 61 will contact terminals 62 to close a circuit between them when the turbine is stopped or is turning at slow speed, and as the speed reaches a predetermined value the switch blade will be shifted to bridge between switch points 63. Solenoids 64, 65 and 66 are provided to control valves 34, 50 and 52, respectively. A power source 67 is connected in the circuit to energize such solenoids appropriately.

Figure 11:
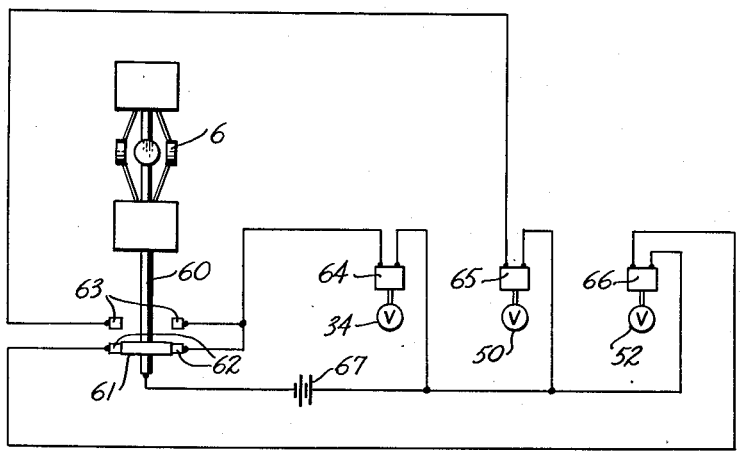
Figure 11 is a diagrammatic view of automatic valve control mechanism.

The control circuit in Figure 11 is arranged to control the valves in the system shown in Figure 1. All the valves are normally closed so that when the engine is to be started solenoids 64 and 66 will be energized through the switch blade 61 and the contacts 62. Valves 34 and 52 will thus be opened so that air will be supplied through conduit 20 to drive the air motor 2, and such air will be discharged through the conduit 23 until the engines starts.

When the engine starts the governor 6 will shift the switch blade 61 from engagement with contacts 62 into engagement with contacts 63. By such movement solenoid 64 will remain energized and solenoid 65 will be energized, whereas solenoid 66 will be deenergized. Valve 34 will thus be held to enable air to be delivered from the air motor 2 acting as a compressor to the header 30. By opening valve 50 air bled from the compressor through pipe 3 may be supplied to pipe 21 of the air motor for further compression by such motor.

At high speeds of the engine booster compression of air by the air motor 2 becomes unnecessary, and the governor 6 will draw rod 60 farther upward to break contact between the blade 61 and the terminals 63. At that time all of solenoids 64, 65 and 66 will be deenergized, and valves 34, 50 and 52 will be closed. Under these conditions air bled from the turbine compressor through pipe 3 will be supplied directly to the compressed air header pipe 30. Such solenoids, then, can shift the control valves and control the drive mechanism 22 automatically to establish any one of the operating plans described, depending upon the speed of the engine and the amount of the demand of accessory devices for compressed air. The drive mechanism 22 will, of course, incorporate suitable reversing mechanism where necessary and any gearing or equivalent mechanism having a drive ratio sufficient to accomplish the purposes of the invention.

We claim as our invention:

1. In combination, a main compressor and gas turbine engine installation having an air operated starting motor capable of being driven to compress air, drive mechanism interconnecting said air motor and said gas turbine engine, operable to effect driving of said engine by said air motor for starting said engine, and said drive mechanism being operable when said engine is running under its own power to effect driving of said air motor by said engine for compressing air, an accessory drive compressed air supply conduit, a bleed from said main compressor on the air outflow side of an air compressing portion thereof, first duct means connecting said bleed and the intake of said air motor for air to be compressed thereby and operable to supply air from said bleed to said air motor, an air discharge aperture connected to said air motor for discharge of air supplied to said air motor for driving it, valve means operable to close said air discharge aperture, and second duct means connecting the discharge of said air motor for air compressed thereby and said accessory drive compressed air supply conduit for flow to said accessory drive compressed air supply conduit from said air motor of air compressed thereby while said air motor is being driven by said engine.

2. In the combination defined in claim 1, the air discharge aperture including an atmosphere conduit connected to the first duct means and communicating with the atmosphere, and the valve means being operable to establish communication between the intake of the air motor for air to be compressed thereby and selectively said atmosphere conduit on the one hand or the main compressor bleed through such first duct means on the other hand.

3. In the combination defined in claim 1, third duct means connecting the main compressor bleed to the accessory drive compressed air supply conduit, and additional valve means operable to control communication from the bleed through the first duct means to the intake of the air motor for air to be compressed thereby and communication between the bleed and the accessory drive compressed air supply conduit through said third duct means.

4. In combination, a main compressor and gas turbine engine installation having an air operated starting motor capable of being driven to compress air, drive mechanism interconnecting said air motor and said gas turbine engine operable to effect driving of said engine by said air motor for starting said engine and incorporating reversing mechanism operable when said engine is running under its own power to drive said air motor by said engine, for compressing air, in the direction opposite the direction in which said air motor rotates when starting said engine, an accessory drive compressed air supply conduit, a bleed from said main compressor on the air outflow side of an air compressing portion thereof, first duct means connecting said bleed and the intake of said air motor for air to be compressed thereby and operable to supply air from said bleed to said air motor, an air discharge aperture connected to said air motor for discharge of air supplied to said air motor for driving it, valve means operable to close said air discharge aperture, second duct means connecting the discharge of said air motor for air compressed thereby and said accessory drive compressed air supply conduit for flow to said accessory drive compressed air supply conduit from said air motor of air compressed thereby while being driven by said engine, and means operable to control the flow of air through said first and second duct means from said main compressor bleed to said air motor and from said air motor to said accessory drive compressed air supply conduit, respectively.

References Cited in the file of this patent

UNITED STATES PATENTS

| Number | Name | Date |
|---|---|---|
| 999,976 | De Ferranti | Aug. 8, 1911 |
| 2,318,905 | Traupel | May 11, 1943 |
| 2,447,696 | Forsyth | Aug. 24, 1948 |
| 2,595,281 | Miller | May 6, 1952 |
| 2,608,054 | Price | Aug. 26, 1952 |

FOREIGN PATENTS

| Number | Country | Date |
|---|---|---|
| 685,830 | France | Apr. 7, 1930 |